United States Patent
Peng et al.

(10) Patent No.: US 11,418,719 B2
(45) Date of Patent: Aug. 16, 2022

(54) DUAL SENSOR IMAGING SYSTEM AND CALIBRATION METHOD WHICH INCLUDES A COLOR SENSOR AND AN INFRARED RAY SENSOR TO PERFORM IMAGE ALIGNMENT AND BRIGHTNESS MATCHING

(71) Applicant: Altek Semiconductor Corp., Hsinchu (TW)

(72) Inventors: Shih-Yuan Peng, Hsinchu (TW); Shu-Chun Cheng, Hsinchu (TW); Hsu-Lien Huang, Taipei (TW); Yun-Chin Li, Hsinchu (TW); Kuo-Ming Lai, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 0 days.

(21) Appl. No.: 17/191,701

(22) Filed: Mar. 4, 2021

(65) Prior Publication Data

US 2021/0195082 A1 Jun. 24, 2021

Related U.S. Application Data

(60) Provisional application No. 63/074,477, filed on Sep. 4, 2020.

(30) Foreign Application Priority Data

Dec. 30, 2020 (TW) ................................ 109146764

(51) Int. Cl.
*H04N 5/235* (2006.01)
*G03B 15/02* (2021.01)
*G03B 7/093* (2021.01)

(52) U.S. Cl.
CPC ........... *H04N 5/2351* (2013.01); *G03B 7/093* (2013.01); *G03B 15/02* (2013.01)

(58) Field of Classification Search
CPC .. H04N 5/2351; H04N 13/239; H04N 5/2258; H04N 5/2353; H04N 5/332;
(Continued)

(56) References Cited

U.S. PATENT DOCUMENTS

| 2008/0024608 A1* | 1/2008 | Hahn ..................... H04N 5/332 348/148 |
| 2011/0228096 A1 | 9/2011 | Friel et al. |

(Continued)

FOREIGN PATENT DOCUMENTS

| CN | 102461156 | 5/2012 |
| CN | 107431760 | 12/2017 |

(Continued)

OTHER PUBLICATIONS

"Office Action of Taiwan Related Application, application No. 109146922", dated Oct. 28, 2021, p. 1-p. 14.
(Continued)

*Primary Examiner* — Luong T Nguyen
(74) *Attorney, Agent, or Firm* — JCIPRNET

(57) ABSTRACT

A dual sensor imaging system and a calibration method thereof are provided. The dual sensor imaging system includes at least one color sensor, at least one infrared ray (IR) sensor, a storage device, and a processor. The processor is configured to load and execute a computer program stored in the storage device to: control the color sensor and the IR sensor to respectively capture multiple color images and multiple IR images of an imaging scene by adopting multiple capturing conditions; calculate multiple color image parameters of the color image captured under each capturing condition and multiple IR image parameters of the IR image
(Continued)

captured under each capturing condition to be used to calculate a difference between a brightness of the color image and a brightness of the IR image; and determine an exposure setting suitable for the color sensor and the IR sensor according to the calculated difference.

20 Claims, 5 Drawing Sheets

(58) Field of Classification Search
CPC .... H04N 13/246; H04N 13/25; H04N 13/257; H04N 17/002; G03B 15/02; G03B 7/093
See application file for complete search history.

(56) References Cited

U.S. PATENT DOCUMENTS

| | | | |
|---|---|---|---|
| 2011/0298898 A1 | 12/2011 | Jung et al. | |
| 2012/0189293 A1 | 7/2012 | Cao et al. | |
| 2013/0342703 A1* | 12/2013 | Lin | H04N 5/23219 382/103 |
| 2015/0245062 A1 | 8/2015 | Shimizu et al. | |
| 2015/0334283 A1 | 11/2015 | Vranceanu | |
| 2017/0094141 A1 | 3/2017 | Hicks | |
| 2017/0316554 A1 | 11/2017 | Nakamura et al. | |
| 2017/0318222 A1* | 11/2017 | Mantzel | H04N 5/2257 |
| 2017/0330053 A1* | 11/2017 | Park | H04N 5/332 |
| 2018/0139431 A1 | 5/2018 | Simek et al. | |
| 2018/0278832 A1 | 9/2018 | Shabtay et al. | |
| 2019/0197667 A1 | 6/2019 | Paluri | |
| 2020/0126246 A1 | 4/2020 | Mantzel et al. | |
| 2020/0134849 A1 | 4/2020 | Blasco Claret et al. | |
| 2020/0166646 A1* | 5/2020 | Van der Sijde | G06T 5/003 |
| 2020/0193584 A1 | 6/2020 | Park et al. | |
| 2020/0294214 A1 | 9/2020 | Numata | |
| 2021/0201476 A1 | 7/2021 | Prasad et al. | |

FOREIGN PATENT DOCUMENTS

| | | |
|---|---|---|
| CN | 107846537 | 3/2018 |
| CN | 110462686 | 11/2019 |
| CN | 110706178 | 1/2020 |
| CN | 111527743 | 8/2020 |
| CN | 111540003 | 8/2020 |
| TW | M458748 | 8/2013 |
| TW | 201711456 | 3/2017 |
| TW | 201721269 | 6/2017 |
| TW | 201931847 | 8/2019 |
| TW | 202008306 | 2/2020 |
| WO | 2020055619 | 3/2020 |
| WO | 2020062276 | 4/2020 |

OTHER PUBLICATIONS

"Office Action of Taiwan Related Application, application No. 109145632", dated Nov. 10, 2021, p. 1-p. 8.
"Office Action of Taiwan Related Application, application No. 109146831", dated Nov. 30, 2021, p. 1-p. 21.
"Office Action of Taiwan Counterpart Application", dated Dec. 28, 2021, p. 1-p. 8, Application No. 109146764.
"Office Action of Taiwan Related Application, Application No. 109145614", dated Mar. 3, 2022, p. 1-p. 17.
"Office Action of U.S. Related Application, Application No. 17214946", dated Apr. 13, 2022, p. 1-p. 36.

* cited by examiner

DUAL SENSOR IMAGING SYSTEM AND CALIBRATION METHOD WHICH INCLUDES A COLOR SENSOR AND AN INFRARED RAY SENSOR TO PERFORM IMAGE ALIGNMENT AND BRIGHTNESS MATCHING

CROSS-REFERENCE TO RELATED APPLICATION

This application claims the priority benefit of U.S. Provisional Application No. 63/074,477, filed on Sep. 4, 2020 and Taiwan application serial no. 109146764, filed on Dec. 30, 2020. The entirety of each of the above-mentioned patent applications is hereby incorporated by reference herein and made a part of this specification.

BACKGROUND

Technical Field

The disclosure relates to an imaging system and a calibration method, and in particular, to a dual sensor imaging system and a calibration method thereof.

Description of Related Art

The exposure conditions of camera (including aperture, shutter, and photosensitivity) may affect the quality of a captured image. Therefore, many cameras automatically adjust the exposure conditions during the image capturing process to obtain clear and bright images. However, in high-contrast scenes such as low light sources or backlights, the result of adjusting the exposure conditions of the camera may result in excessive noise or overexposure in some areas, such that the image quality of all areas cannot be taken care of.

In this regard, the current technology adopts a new image sensor architecture, which utilizes the characteristic of high light sensitivity of the infrared ray (IR) sensor, and interleaves IR pixels among the color pixels of the image sensor to assist in brightness detection. For example, FIG. 1 is a schematic diagram of conventional image capture using an image sensor. Please refer to FIG. 1, in addition to red (R), green (G), blue (B), and other color pixels, a conventional image sensor 10 is also interleaved with infrared (I) pixels. In this way, the image sensor 10 can combine color information 12 captured by the R, G, and B color pixels with brightness information 14 captured by the I pixel to obtain an image 16 with moderate color and brightness.

However, under the architecture of the single image sensor, the exposure conditions of each pixel in the image sensor are the same. Therefore, only the exposure conditions more suitable for color pixels or I pixels can be selected to capture images. It is still impossible to effectively use the characteristics of the two types of pixels to improve the image quality of the captured image.

SUMMARY

The disclosure provides a dual sensor imaging system and a calibration method thereof, which use independently configured color sensor and infrared ray (IR) sensor to capture multiple images under different capturing conditions, so as to perform image alignment and brightness matching, and then to be applied to a subsequently captured image, thereby improving the image quality of the captured image.

The dual sensor imaging system includes at least one color sensor, at least one IR sensor, a storage device, and a processor coupled to the color sensor, the IR sensor, and the storage device. The processor is configured to load and execute a computer program stored in the storage device to: control the color sensor and the IR sensor to respectively capture multiple color images and multiple IR images of an imaging scene by adopting multiple capturing conditions; calculate multiple color image parameters of the color image captured under each capturing condition and multiple IR image parameters of the IR image captured under each capturing condition to be used to calculate a difference between a brightness of the color image and a brightness of the IR image; and determine an exposure setting suitable for the color sensor and the IR sensor according to the calculated difference.

A calibration method of a dual sensor imaging system of the disclosure is suitable for the dual sensor system including at least one color sensor, at least one IR sensor, a storage device, and a processor. The method includes the following steps. The color sensor and the IR sensor are controlled to respectively capture multiple color images and multiple IR images of an imaging scene by adopting multiple capturing conditions. Multiple color image parameters of the color image captured under each capturing condition and multiple IR image parameters of the IR image captured under each capturing condition are calculated to be used to calculate a difference between a brightness of the color image and a brightness of the IR image. An exposure setting suitable for the color sensor and the IR sensor is determined according to the calculated difference.

Based on the above, the disclosure provides a dual sensor imaging system and a calibration method thereof, which use independently configured color sensor and IR sensor to capture multiple images by adopting different capturing conditions, and determine the exposure and aligning settings of the color sensor and the IR sensor according to the positional relationship of the corresponding pixels in these images and the brightness difference between these images, so as to perform image alignment and brightness matching on the subsequently captured image, thereby improving the image quality of captured image.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
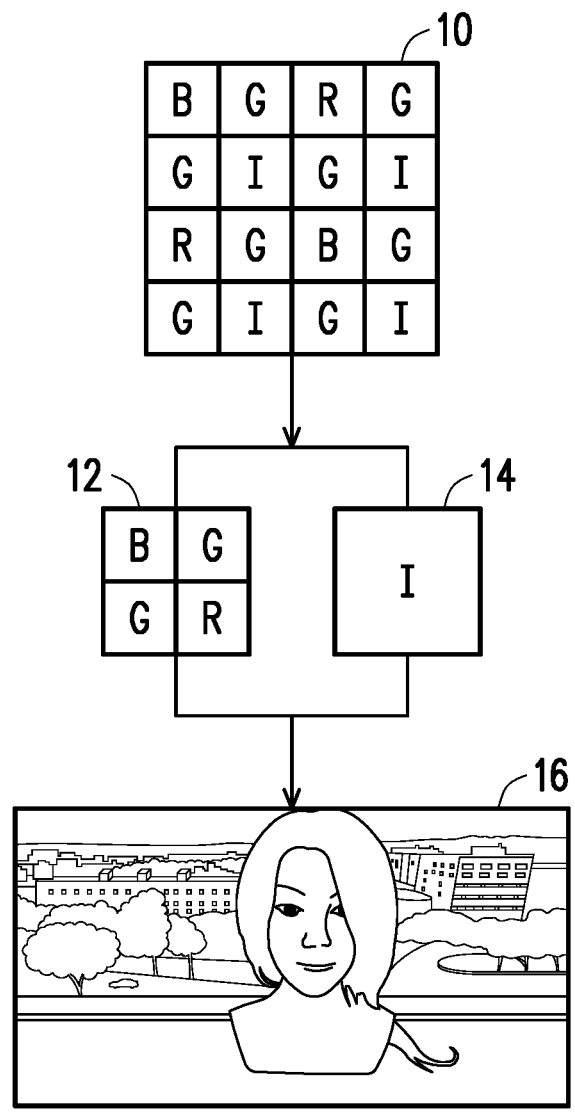
FIG. 1 is a schematic diagram of conventional image capture using an image sensor.
Figure 2:
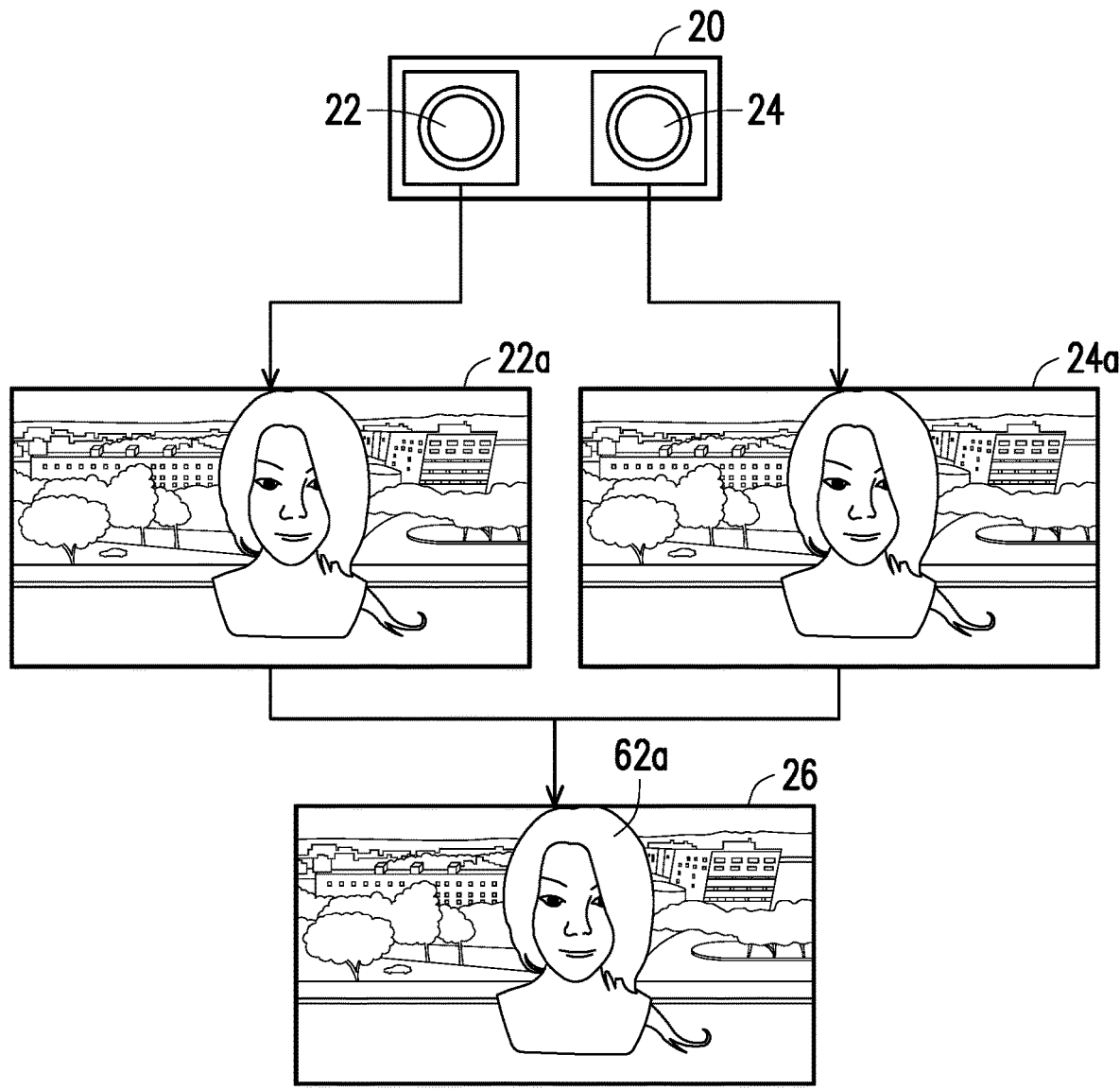
FIG. 2 is a schematic diagram of image capture using an image sensor according to an embodiment of the disclosure.

FIG. 2 is a schematic diagram of capturing images by using an image sensor according to an embodiment of the disclosure. Referring to FIG. 2, an image sensor 20 of an embodiment of the disclosure adopts a dual sensor architecture of independently configured color sensor 22 and infrared ray (IR) sensor 24. Using the characteristics of each of the color sensor 22 and the IR sensor 24, multiple images are respectively captured by adopting multiple exposure conditions suitable for the current imaging scene, and a color image 22a and an IR image 24a with an appropriate exposure conditions are selected. Through image fusion, the IR image 24a is configured to complement the texture details lacking in the color image 22a, so as to obtain a scene image 26 with good color and texture details.

Figure 3:
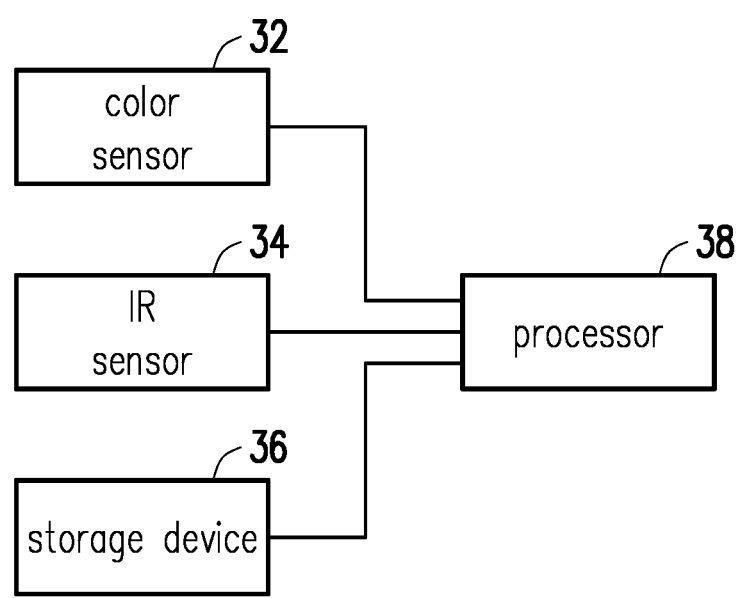
FIG. 3 is a block diagram of a dual sensor imaging system according to an embodiment of the disclosure.

FIG. 3 is a block diagram of a dual sensor imaging system according to an embodiment of the disclosure. Referring to FIG. 3, a dual sensor imaging system 30 of the embodiment is configured in electronic device such as mobile phones, tablets, laptops, navigation devices, dashcams, digital cameras, digital video cameras, etc., and is configured to provide an imaging function. The dual sensor imaging system 30 includes at least one color sensor 32, at least one IR sensor 34, a storage device 36, and a processor 38, and the functions thereof are as follows.

The color sensor 32, for example, includes a charge coupled device (CCD), a complementary metal-oxide semiconductor (CMOS) element, or other types of photosensitive elements, and may sense light intensity to generate images of the imaging scene. The color sensor 32 is, for example, an RGB image sensor which includes red (R), green (G), and blue (B) color pixels, and is configured to capture color information of red light, green light, blue light, etc. in the imaging scene, and fuse the color information to generate a color image of the imaging scene.

The IR sensor 34, for example, includes CCD, a CMOS element, or other types of photosensitive elements, and can sense infrared ray by adjusting the wavelength sensing range of the photosensitive element. The IR sensor 34, for example, uses the above photosensitive elements as pixels to capture infrared information in the imaging scene, and fuse the infrared information to generate an IR image of the imaging scene.

The storage device 36 is, for example, any type of fixed or removable random access memory (RAM), read-only memory (ROM), flash memory, hard disk, similar elements, or a combination of the above elements, and is configured to store a computer program executed by the processor 38. In some embodiment, the storage device 36 may, for example, also store the color image captured by the color sensor 32 and the IR image captured by the IR sensor 34.

The processor 38 is, for example, a central processing unit (CPU), other programmable general-purpose or specific-purpose microprocessors, microcontroller, digital signal processors (DSPs), programmable controller, application specific integrated circuits (ASICs), programmable logic devices (PLDs), other similar devices, or a combination of these devices, and the disclosure is not limited thereto. In the embodiment, the processor 38 may load a computer program from the storage device 36 to execute the calibration method of the dual sensor imaging system of the embodiment of the disclosure.

Based on the different characteristics (such as resolution, wavelength range, and field of view (FOV)) of the color sensor 32 and the IR sensor 34, the disclosure provides a calibration method, which may calibrate the color sensor 32 and the IR sensor 34 assembled on the dual sensor imaging system 30 in the production stage to balance the difference between the color sensor 32 and the IR sensor 34 under different capturing conditions. The calibration result will be stored in the storage device 36, and may be used as a basis for adjusting the captured image in the subsequent run stage.

Figure 4:
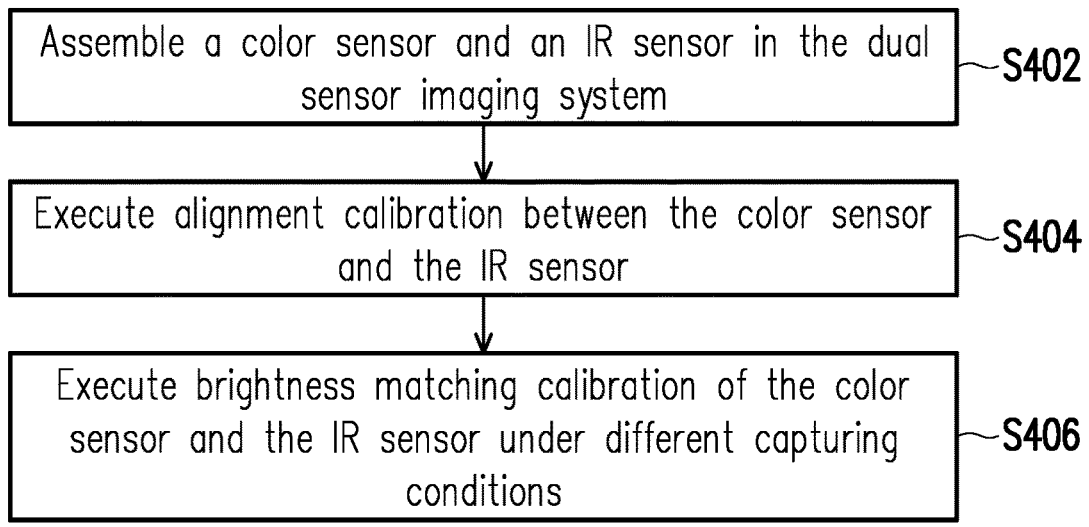
FIG. 4 is a flow chart of a calibration method of the dual sensor imaging system according to an embodiment of the disclosure.

FIG. 4 is a flow chart of a calibration method of the dual sensor imaging system according to an embodiment of the disclosure. Referring to FIG. 3 and FIG. 4 at the same time, the method of the embodiment is suitable for the dual sensor imaging system 30, which is suitable for calibrating the color sensor 32 and the IR sensor 34 of the dual sensor imaging system 30 in the production stage. The following is a description of the detailed steps of the calibration method of the embodiment in conjunction with the elements of the dual sensor imaging system 30.

In Step S402, at least one color sensor 32 and at least one IR sensor 34 are assembled in the dual sensor imaging system 30. The color sensor 32 and the IR sensor 34 are assembled in the image sensor by, for example, a robot, such as the color sensor 22 and the IR sensor 24 assembled in the image sensor 20 shown in FIG. 2.

In Step S404, the processor 38 executes alignment calibration between the color sensor 32 and the IR sensor 34. The processor 38 may, for example, execute an image alignment algorithm such as a brute force algorithm, an optical flow, homography transformation, or local warping to align the color image captured by the color sensor 32 and the IR image captured by the IR sensor 34, and the detailed implementation will be described later.

In Step S406, the processor 38 executes brightness matching calibration of the color sensor 32 and the IR sensor 34 under different capturing conditions. The processor 38 may, for example, calculate the difference between the color image and the IR image captured under different capturing conditions, so as to determine an exposure setting suitable for the color sensor 32 and the IR sensor 34, and the detailed implementation will be described later.

Figure 5:
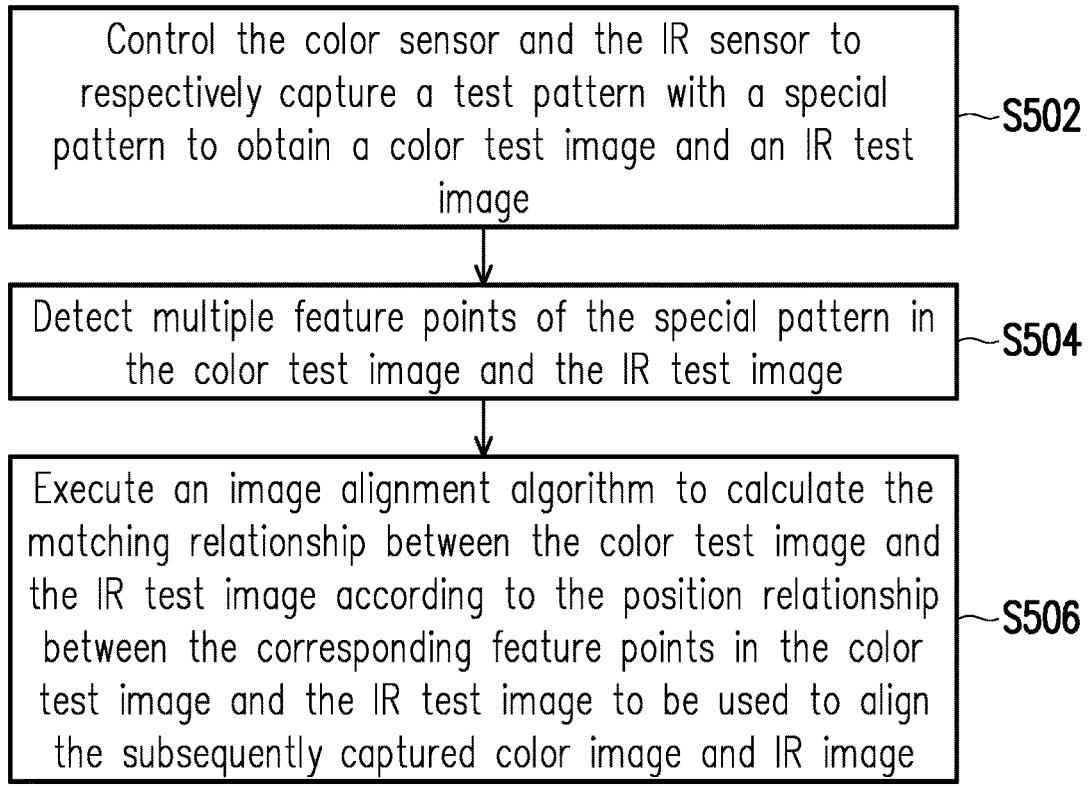
FIG. 5 is a flow chart of an aligning calibration method of the dual sensor imaging system according to an embodiment of the disclosure.

For the above alignment calibration, FIG. 5 is a flow chart of an aligning calibration method of the dual sensor imaging system according to an embodiment of the disclosure. Referring to FIG. 3 and FIG. 5 at the same time, the method of the embodiment is suitable for the dual sensor imaging system 30, and the following is a description of the detailed steps of the aligning calibration method of the embodiment in conjunction with the elements of the dual sensor imaging system 30.

In Step S502, the processor 38 controls the color sensor 32 and the IR sensor 34 to respectively capture a test chart with a special pattern, so as to obtain a color test image and an IR test image. The special pattern is, for example, a black and white checkerboard pattern, or other patterns with clearly distinguishable features, and is not limited thereto.

In Step S504, the processor 38 detects multiple feature points of the special pattern in the color test image and the IR test image.

In some embodiment, the processor 38 may, for example, cut each color test image and IR test image into multiple blocks, and execute a feature detection algorithm to detect at least one feature point within each block. The processor 38, for example, determines the number of feature points detected from each block according to its own calculation ability. The feature detection algorithm is, for example, Harris corner detection. In some embodiment, the processor 38 may, for example, select edge pixels in each block or pixels with high local deviation in each block as the detected feature points, and is not limited thereto.

In Step S506, the processor 38 executes an image alignment algorithm to calculate the matching relationship between the color test image and the IR test image according to the position relationship between the corresponding feature points in the color test image and the IR test image, to be used to align the subsequently captured color image and IR image. When executing image alignment, the processor 38 may, for example, obtain all the feature points in the color image and all the feature points in the IR image, so as to execute the image alignment algorithm for these feature points.

In some embodiment, when the imaging scene is a flat scene, the processor 38 may move a patch including multiple pixels at a corresponding position in the IR test image for a specified feature point in the feature points detected from the color test image to search for a corresponding feature point corresponding to the specified feature point in the IR test image. The processor 38, for example, takes a pixel corresponding to the specified feature point in the IR test image as the center, and moves the patch around the pixel. Then, the pixels located in the patch is compared with the pixels located around the specified feature point in the color test image until the pixels in the patch match the pixels around the specified feature point (for example, the sum of difference values of pixel values of all pixels is less than a predetermined threshold). Finally, the processor 38 may determine a center point pixel at the location of the patch when the matching is achieved as the corresponding feature point corresponding to the specified feature point. The processor 38 may repeat the above matching actions until the corresponding relationship of all feature points is obtained.

And them, the processor 38 may, for example, execute a random sample consensus (RANSAC) algorithm to establish a homography transformation matrix as follows:

$$\begin{bmatrix} x' \\ y' \\ 1 \end{bmatrix} = \begin{bmatrix} a & b & c \\ d & e & f \\ g & h & 1 \end{bmatrix} \begin{bmatrix} x \\ y \\ 1 \end{bmatrix}$$

where (x, y) represents the location of the specified feature point in the color test image, (x', y') represents the location of the corresponding feature point in the IR test image, and a to h represent the variables. The processor 38 may, for example, substitute the positions of each feature point in the color test image and the corresponding feature point in the IR test image into the above homography transformation matrix for solution, so as to use the obtained solution as the matching relationship between the color test image and the IR test image.

In some embodiment, when the imaging scene is a scene with multiple depths, due to the parallax between the color sensor 32 and the IR sensor 34, the captured images may have aberration. Therefore, it is necessary to calculate the matching relationship for image planes with different depths. At this time, the processor 38 may use the color test image and the IR test image to calculate multiple depths of the imaging scene, so as to divide the imaging scene into multiple depth scenes with different depths (such as a close scene and a far scene). The processor 38 may, for example, establish a quadratic equation for each depth scene, as follows:

$$\begin{cases} x' = ax^2 + bx + c \\ y' = dy^2 + ey + f \end{cases}$$

where (x, y) represents the location of the specified feature point in the color test image, (x', y') represents the location of the corresponding feature point in the IR test image, and a to f represent the variables. The processor 38, for example, substitutes the positions of each feature point in the color test image and the corresponding feature point in the IR test image into the above quadratic equation for solution, so as to use the obtained solution as the matching relationship between the color test image and the IR test image.

Figure 6:
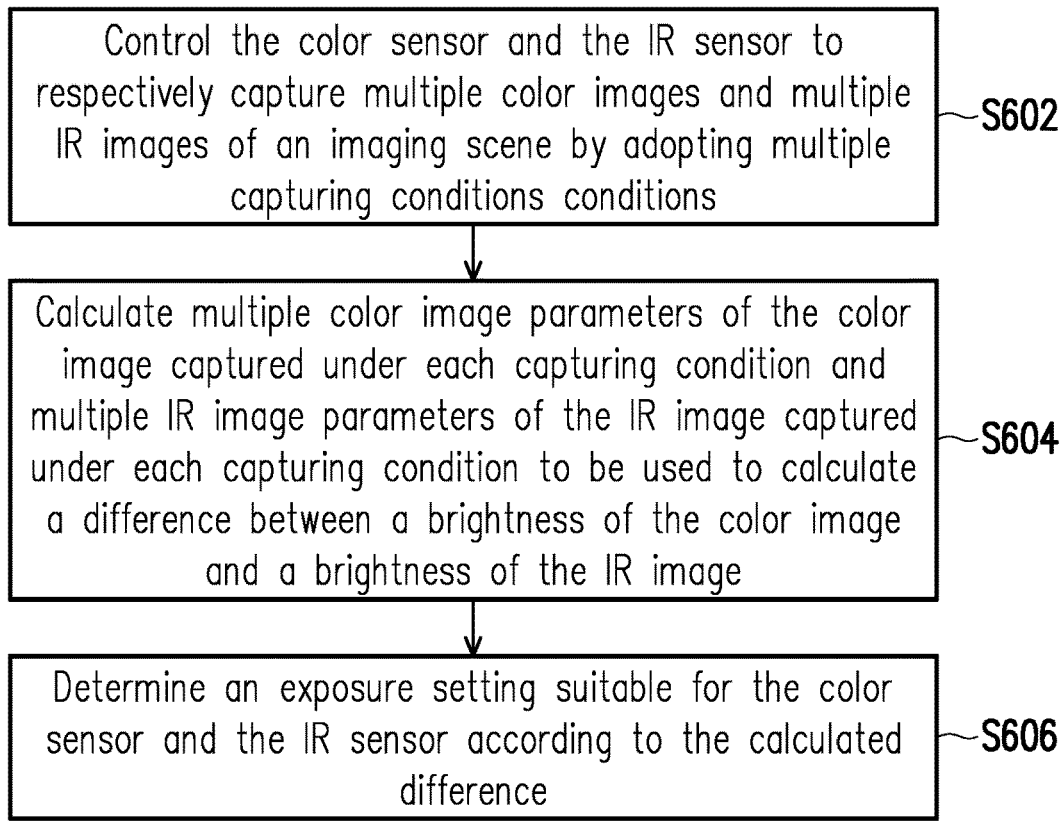
FIG. 6 is a flow chart of a brightness matching calibration method of the dual sensor imaging system according to an embodiment of the disclosure.

On the other hand, for the above brightness matching calibration, FIG. 6 is a flow chart of a brightness matching method of the dual sensor imaging system according to an embodiment of the disclosure. Referring to FIG. 3 and FIG. 6 at the same time, the method of the embodiment is suitable for the dual sensor imaging system 30, and the following is a description of the detailed steps of the brightness matching calibration method of the embodiment in conjunction with the elements of the dual sensor imaging system 30.

In Step S602, the processor 38 controls the color sensor 32 and the IR sensor 34 to respectively capture multiple color images and multiple IR images of an imaging scene by adopting multiple capturing conditions. The capturing conditions, for example, include one of the wavelength range and brightness of ambient light, the distance from the subject or background in the imaging scene, or a combination thereof, and is not limited thereto.

In Step S604, the processor 38 calculates multiple color image parameters of the color image captured under each capturing condition and multiple IR image parameters of the IR image captured under each capturing condition to be used to calculate a difference between a brightness of the color image and a brightness of the IR image.

In some embodiment, for images captured under different capturing conditions, the processor 38, for example, calculates 3A (including auto focus (AF), auto exposure (AE), and auto white balance (AWB)) statistics of each image to be used to calculate the difference (such as a difference value or a ratio) between the brightness of the images.

In some embodiment, the processor 38 may, for example, cut each color image and each IR image into multiple blocks, and calculate the average pixel value of all pixels in each block, so as to calculate a difference between the average pixel values of corresponding blocks to be used as the difference between the brightness of the color image and the brightness of the IR image.

In some embodiment, the processor 38 may, for example, calculate the image histogram of each color image and each IR image, so as to calculate a difference between the image histograms of the color image and the IR image to be used as the difference between the brightness of the color image and the brightness of the IR image.

Back to the flow chart of FIG. 6, in Step S606, the processor 38 determines the exposure setting suitable for the color sensor and the IR sensor according to the calculated difference by.

In some embodiment, in order to achieve image synchronization, the processor 38 may, for example, control the color sensor 32 and the IR sensor 34 to respectively capture the color image and the IR image of the imaging scene by adopting the same exposure time, and calculate the brightness difference between the color image and the IR image, so as to calculate the gain for adjusting the brightness of the color image and/or the brightness of the IR image. That is, the processor 38 may calculate the gain that may compensate for the brightness difference between the color image and the IR image, which may be the gain for the color image, the gain for the IR image, or the gain for both, and is not limited thereto.

For example, if the color image captured by adopting the same exposure time is brighter, the gain for adjusting the brightness of the IR image may be calculated, so that the brightness of the IR image multiplied by the gain is equivalent to the brightness of the color image. The calculated gain may, for example, be stored in the storage device 36 along with the corresponding capturing condition As such, in the subsequent run stage, whenever the color image and the IR image are captured, the processor 38 may obtain the gain corresponding to the capturing condition from the storage device 36 by identifying the capturing condition, and multiply the pixel value of the captured color image or IR image by the obtained gain, such that the brightness of the color image can match the brightness of the IR image.

In some embodiment, an IR projector may be additionally configured in the dual sensor imaging system 30, so as to assist the processor 38 in calculating the distances between the dual sensor camera system 30 and the subject and background in the imaging scene in conjunction with the IR sensor 32.

Figure 7:
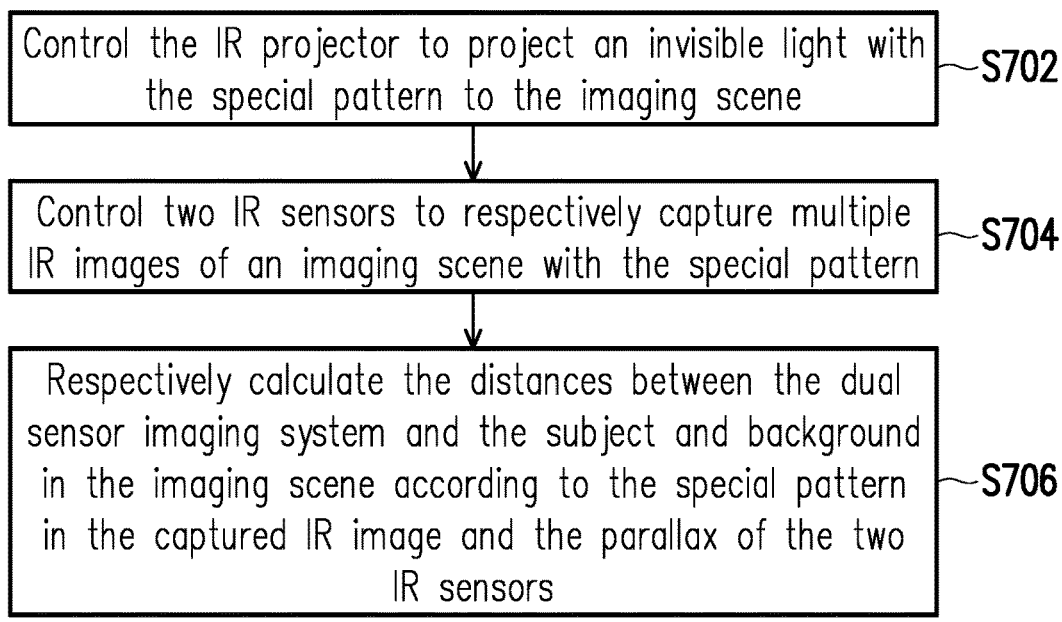
FIG. 7 is a flow chart of a calibration method of the dual sensor imaging system according to an embodiment of the disclosure.

In detail, FIG. 7 is a flow chart of a calibration method of the dual sensor imaging system according to an embodiment of the disclosure. Referring to FIG. 3 and FIG. 7 at the same time, the method of the embodiment is suitable for the dual sensor imaging system 30, and the following is a description of the detailed steps of the calibration method of the embodiment in conjunction with the elements of the dual sensor imaging system 30.

In Step S702, the processor 38 controls the IR projector to project an invisible light with a special pattern to the imaging scene.

In Step S704, the processor 38 controls two IR sensors in the IR sensor 32 to respectively capture multiple IR images of the imaging scene with the special pattern.

In Step S706, the processor 38 respectively calculates the distances between the dual sensor imaging system 30 and the subject and background in the imaging scene according to the special pattern of the captured IR image and the parallax between the two IR sensors. Since the special pattern projected by the IR projector to the imaging scene is not easily affected by the environment, the above method may obtain more accurate distances from the subject and/or background to be used to identify capturing conditions as a basis for subsequent image compensation.

In summary, in the dual sensor imaging system and the calibration method thereof provided by the disclosure, the color sensor and the IR sensor configured on the dual sensor imaging system respectively capture multiple images by adopting different capturing conditions, so as to perform image alignment and brightness matching calibration on the color sensor and IR sensor, and use the calibration result as the basis for adjusting the subsequently captured image. In this way, the image quality of the image captured by the dual sensor imaging system can be improved.

What is claimed is:

1. A dual sensor imaging system, comprising:
at least one color sensor;
at least one infrared ray (IR) sensor;
a storage device, storing a computer program; and
a processor, coupled to the at least one color sensor, the at least one IR sensor, and the storage device, and configured to load and execute the computer program to:
control the at least one color sensor and the at least one IR sensor to respectively capture a plurality of color images and a plurality of IR images of an imaging scene by adopting a plurality of capturing conditions;
calculate a plurality of color image parameters of a color image of the plurality of color images captured under each of the plurality of capturing conditions and a plurality of IR image parameters of an IR image of the plurality of IR images captured under each of the plurality of capturing conditions to be used to calculate a difference between a brightness of the color image and a brightness of the IR image; and
determine an exposure setting suitable for the at least one color sensor and the at least one IR sensor according to the calculated difference.

2. The dual sensor imaging system according to claim 1, wherein the processor:
cuts each of the plurality of color images and each of the plurality of IR images into a plurality of blocks, and calculates an average pixel value of all pixels in each of the plurality of blocks; and
calculate a difference between average pixel values of the corresponding blocks as the difference between the brightness of the color image and the brightness of the IR image.

3. The dual sensor imaging system according to claim 1, wherein the processor:
calculates an image histogram of each of the plurality of color images and each of the plurality of IR images; and
calculates a difference between the image histogram of the color image and the image histogram of the IR image as the difference between the brightness of the color image and the brightness of the IR image.

4. The dual sensor imaging system according to claim 1, wherein the processor:
controls the at least one color sensor and the at least one IR sensor to respectively capture the color image and the IR image of the imaging scene by adopting a same exposure time; and
calculates a gain for adjusting the brightness of the color image or the brightness of the IR image according to the calculated difference between the brightness of the color image and the brightness of the IR image.

5. The dual sensor imaging system according to claim 1, wherein the processor further:
controls the at least one color sensor and the at least one IR sensor to respectively capture a test chart with a special pattern, so as to obtain a color test image and an IR test image;
detects a plurality of feature points of the special pattern in the color test image and the IR test image; and
executes an image alignment algorithm to calculate a matching relationship between the color test image and the IR test image according to a position relationship between the corresponding feature points in the color test image and the IR test image to be used to align a subsequently captured color image and the IR image.

6. The dual sensor imaging system according to claim 5, wherein the processor:
- cuts the color test image and the IR test image into a plurality of blocks, and executes a feature detection algorithm to detect at least one of the plurality of feature points within each of the plurality of blocks, wherein the feature detection algorithm comprises a Harris corner detection.

7. The dual sensor imaging system according to claim 5, wherein the processor:
- moves a patch comprising a plurality of pixels with a pixel corresponding to a specified feature point in the IR test image as a center for the specified feature point in the feature points detected from the color test image to search for a corresponding feature point corresponding to the specified feature point in the IR test image; and
- executes a random sample consensus algorithm to establish a homography transformation matrix, and substitutes positions of the feature point in the color test image and the corresponding feature point in the IR test image into the homography transformation matrix for solution, so as to use the obtained solution as the matching relationship between the color test image and the IR test image.

8. The dual sensor imaging system according to claim 5, wherein the processor:
- uses the color test image and the IR test image to calculate a plurality of depths of the imaging scene, so as to divide the imaging scene into a plurality of depth scenes; and
- establishes a quadratic equation for each of the plurality of depth scenes, and substitutes positions of the feature point in the color test image and the corresponding feature point in the IR test image located within each of the plurality of depth scenes into the quadratic equation for solution, so as to use the obtained solution as the matching relationship between the color test image and the IR test image.

9. The dual sensor imaging system according to claim 5, wherein the image alignment algorithm comprises a brute force algorithm, an optical flow, a homography transformation, or a local warping.

10. The dual sensor imaging system according to claim 1, further comprising an IR projector, wherein the processor further:
- controls the IR projector to project an invisible light with a special pattern to the imaging scene;
- controls two IR sensors in the at least one IR sensor to respectively capture a plurality of IR images of an imaging scene with the special pattern; and
- respectively calculates distances between the dual sensor imaging system and a subject and a background in the imaging scene according to the special pattern in the captured IR image and parallax of the two IR sensors.

11. A calibration method of a dual sensor imaging system, wherein the dual sensor imaging system comprises at least one color sensor, at least one infrared ray (IR) sensor, and a processor, the calibration method comprising:
- controlling the at least one color sensor and the at least one IR sensor to respectively capture a plurality of color images and a plurality of IR images of an Imaging scene by adopting a plurality of capturing conditions;
- calculating a plurality of color image parameters of a color image of the plurality of color images captured under each of the plurality of capturing conditions and a plurality of IR image parameters of an IR image of the plurality of IR images captured under each of the plurality of capturing conditions to be used to calculate a difference between a brightness of the color image and a brightness of the IR image; and
- determining an exposure setting suitable for the at least one color sensor and the at least one IR sensor according to the calculated difference.

12. The calibration method according to claim 11, wherein the step of calculating the difference between the brightness of the color image and the brightness of the IR image comprises:
- cutting each of the plurality of color images and each of the plurality of IR images into a plurality of blocks, and calculating an average pixel value of all pixels within each of the plurality of blocks; and
- calculating a difference between average pixel values of the corresponding blocks as the difference corresponded to the same block between the brightness of the color image and the brightness of the IR image.

13. The calibration method according to claim 11, wherein the step of calculating the difference between the brightness of the color image and the brightness of the IR image comprises:
- calculating an image histogram of each of the plurality of color images and each of the plurality of IR images; and
- calculating a difference between the image histogram of the color image and the image histogram of the IR image as the difference between the brightness of the color image and the brightness of the IR image.

14. The calibration method according to claim 11, further comprising:
- controlling the at least one color sensor and the at least one IR sensor to respectively capture the color image and the IR image of the imaging scene by adopting a same exposure time; and
- calculating a gain for adjusting the brightness of the color image or the brightness of the IR image according to the calculated difference between the brightness of the color image and the brightness of the IR image.

15. The calibration method according to claim 11, further comprising:
- controlling the at least one color sensor and the at least one IR sensor to respectively capture a test chart with a special pattern, so as to capture a color test image and an IR test image;
- detecting a plurality of feature points of the special pattern in the color test image and the IR test image; and
- executing an image alignment algorithm to calculate a matching relationship between the color test image and the IR test image according to a position relationship between the corresponding feature points in the color test image and the IR test image to be used to align a subsequently captured color image and IR image.

16. The calibration method according to claim 15, wherein the step of detecting the plurality of feature points of the special pattern in the color test image and the IR test image comprises:
- cutting the color test image and the IR test image into a plurality of blocks, and executing a feature detection algorithm to detect at least one of the plurality of feature points in each of the plurality of blocks, wherein the feature detection algorithm comprises a Harris corner detection.

17. The calibration method according to claim 15, wherein the step of calculating the matching relationship between the color test image and the IR test image comprises:

moving a patch comprising a plurality of pixels with a pixel corresponding to a specified feature point in the IR test image as a center for the specified feature point in the feature points detected from the color test image to search for a corresponding feature point corresponding to the specified feature point in the IR test image; and executing a random sample consensus algorithm to establish a homography transformation matrix, and substituting positions of the feature point in the color test image and the corresponding feature point in the IR test image into the homography transformation matrix for solution, so as to use the obtained solution as the matching relationship between the color test image and the IR test image.

18. The calibration method according to claim 15, wherein the step of calculating the matching relationship between the color test image and the IR test image comprises:

using the color test image and the IR test image to calculate a plurality of depths of the imaging scene, so as to divide the imaging scene into a plurality of depth scenes; and establishing a quadratic equation for each of the plurality of depth scenes, and substituting positions of the feature point in the color test image and the corresponding feature point in the IR test image within each of the plurality of depth scenes into the quadratic equation for solution, so as to use the obtained solution as the matching relationship between the color test image and the IR test image.

19. The calibration method according to claim 15, wherein the image alignment algorithm comprises a brute force algorithm, an optical flow, a homography transformation, or a local warping.

20. The calibration method according to claim 11, wherein the dual sensor imaging system further comprises an IR projector, the calibration method further comprising:

controlling the IR projector to project an invisible light with a special pattern to the imaging scene;

controlling two IR sensors in the at least one IR sensor to respectively capture a plurality of IR images of an imaging scene with the special pattern; and respectively calculating distances between the dual sensor imaging system and a subject and a background in the imaging scene according to the special pattern in the captured IR image and parallax of the two IR sensors.

\* \* \* \* \*